(12) United States Patent
Utsugi et al.

(10) Patent No.: US 6,964,829 B2
(45) Date of Patent: Nov. 15, 2005

(54) LITHIUM SECONDARY CELL AND METHOD FOR MANUFACTURING SAME

(75) Inventors: Koji Utsugi, Tokyo (JP); Mitsuhiro Mori, Tokyo (JP); Jiro Iriyama, Tokyo (JP); Hironori Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 374 days.

(21) Appl. No.: 09/985,852

(22) Filed: Nov. 6, 2001

(65) Prior Publication Data

US 2002/0086213 A1 Jul. 4, 2002

(30) Foreign Application Priority Data

Nov. 6, 2000 (JP) ........................................ 2003-337804

(51) Int. Cl.$^7$ ................................................ H01M 4/58
(52) U.S. Cl. .................. 429/231.95; 429/233; 429/126; 29/623.5
(58) Field of Search ............................. 429/231.95, 233, 429/126; 29/623.5

(56) References Cited

U.S. PATENT DOCUMENTS 5,112,704 A * 5/1992 Furukawa et al. .......... 429/330
5,641,591 A * 6/1997 Kawakami et al. ........ 29/623.5

FOREIGN PATENT DOCUMENTS

| JP | 7-50162 | 2/1995 |
| JP | 7-94186 | 4/1995 |
| JP | 7-296812 | 11/1995 |
| JP | 7-302617 | * 11/1995 |
| JP | 8-250108 | * 9/1996 |
| JP | 08-255610 | 10/1996 |
| JP | 09-92280 | 4/1997 |
| JP | 11-67208 | 3/1999 |
| JP | 11-135153 | 5/1999 |
| JP | 11-288706 | * 10/1999 |

* cited by examiner

Primary Examiner—Laura Weiner
(74) Attorney, Agent, or Firm—Sughrue Mion, PLLC

(57) ABSTRACT

A lithium secondary cell has, on a conductive substrate (collector) a lithium layer containing metallic lithium or an alloy thereof, and further has a metal fluoride substance film containing at least one type metal fluoride substance.

9 Claims, 3 Drawing Sheets

LITHIUM SECONDARY CELL AND METHOD FOR MANUFACTURING SAME

BACKGROUND OF THE INVENTION

1. Field of the Invention

The present invention relates to a lithium secondary cell having metallic lithium or an alloy thereof as an active anode substance and a method for manufacturing same, and more particularly to a lithium secondary cell and method for manufacturing same, which does not have a tendency for dendrite growth, and which has superior cycle characteristics.

2. Related Art

Although a lithium cell with a anhydrous electrolytic fluid using metallic lithium features superior energy density and a high electromotive force, when charged, it exhibits dendrite formation on the lithium surface of the anode, and in some cases, the dendrite formation can break through a separator, causing a short to the cathode or peeling of the lithium dendrite from the conductive base (collector). These factors cannot only cause the cell not to function, but can also lower the safeness of the cell or worsen the cycle characteristics of the cell, due to abnormal reactions caused by shorting.

In order to suppress dendrite growth in metallic lithium, it is desirable to perform dielectric reactions having uniform precipitation and reaction speed. For this reason, it is necessary that the metallic lithium crystal structure be uniform, and that the surface reaction and coverage on the surface at which the reaction occurs be uniform.

Given the above, there have been proposals, for the purpose of suppressing dendrite formation, of forming alloys of metallic lithium with components of aluminum, bismuth, lead, tin, or indium or the like, or of forming an oxide layer on the surface of the metallic lithium. Using these methods, however, the operating voltage of the cell is low compared to the case of using an anode made of metallic lithium, and there is a reduction in the energy density. Additionally, when such alloys are used repeated charging and discharging results in deterioration of the lithium alloy in the form of micro-powder formation.

Another proposal that has been made is that of forming a covering film of lithium fluoride or the like, making use of a chemical reaction on the surface thereof, so as to suppress dendrite formation.

For example, in the Japanese Un-Examined Patent Publication (KOKAI) No. 7-302617, there is disclosure of an anhydrous electrolytic cell having a covering including a lithium compound such as lithium fluoride on the surface of the anode. This lithium fluoride covering film is obtained exposing a anode having a covering film or lithium hydroxide or lithium oxide formed by natural oxidation in the atmosphere to an electrolytic fluid including $LiPF_6$, to cause a reaction between the lithium fluoride and water, and then causing a reaction with lithium hydroxide. Because these lithium fluoride-covering films make use of a reaction with water at an electrode boundary, however, there is a tendency for components from sub-reactions intruding into the covering film, thereby making it difficult to achieve a uniform covering film. There are also cases in which the lithium hydroxide or lithium oxide covering film is not form uniformly, or in which there are locations at which lithium is partially exposed, in which cases not only is it impossible to achieve formation of a uniform thin film, but also there is a problem with safety, because of an abnormal reaction with water or hydrogen fluoride or the like. If the reaction is insufficient, there will be a residue of an unwanted covering film other than the fluoride, leading to an adverse effect, such as a reduction in ion conductivity.

Additionally, with a method such as this, in which a fluoride layer is obtained by making use of a chemical reaction at a boundary, there is a limitation on the possible fluorides and electrolytic fluids that can be used, thereby making it difficult to achieve a stable covering film. For this reason, this method does not achieve a sufficient cycle life, and has still not been developed to a practically usable stage.

In the Japanese Un-Examined Patent Publication (KOKAI) No. 8-250108, there is disclosure of method for forming a lithium fluoride covering film, by placing a metallic foil made of metallic lithium or a lithium-aluminum alloy in an atmosphere of argon gas or nitrogen gas containing a small amount of hydrogen fluoride so as to cause a reaction, thereby forming a lithium covering film on the surface of the metallic foil (anode). In this case, if a covering film already exists on the surface of the metallic lithium, there is a tendency for the reaction to be non-uniform, particularly if there is a plurality of covering films, thereby making it difficult to form a complete lithium fluoride covering film. Additionally, because this method uses a reaction between hydrogen fluoride and a boundary with metallic lithium to form lithium fluoride, it is not suited to the case in which it is necessary to form a thick lithium fluoride covering film. As a result, it is not possible to achieve a lithium secondary cell with satisfactory cycle performance.

Additionally, in Japanese Un-Examined Patent Publication (KOKAI) No. 11-288706, there is disclosure of improvement in the cycle life of a battery, by forming a surface covering film having as a main component a rocksalt type crystal structure, on the surface of s lithium sheet oriented with preference to a uniform crystal structure (that is, 100), thereby enabling suppressing a dendrite precipitation reaction of the metallic lithium. This disclosure mentions that it is preferable that the substance used as a surface covering film be selected as at least one lithium halide, selected from among LiCl, LiBr, and LiI. In this case, in order to form a solid solution covering film of at least one of LiCl, LiBr, and LiI and LiF, a lithium sheet formed by pressuring (cold rolling) and oriented preferably for (100) on the crystal plane is immersed in a dielectric fluid containing at least one of a sodium molecule or sodium ion, a bromine molecule or bromine ion, and an iodine molecule or iodine ion with a fluoride molecule or fluoride ion. This technology makes use of a cold-rolled lithium sheet, and because it is easy to expose the lithium sheet to the atmosphere, there is a tendency for a covering film to be formed on the surface due to water content and the like, leading to non-uniformity in the activated points, making it impossible to achieve the intended stable covering film and causing insufficient suppression of dendrite growth. Additionally, because of the immersion into an electrolytic fluid, the same problems arise as noted with regard to the Japanese Un-Examined Patent Publication (KOKAI) No. 7-302617. Additionally, because of the use of a cold-rolled lithium sheet, compared with the case of using an amorphous lithium layer, there is a greater tendency toward dendrite formation, leading to possible insufficient cycle life.

In the Japanese Un-Examined Patent Publication (KOKAI) No. 7-296812, there is a proposal for using, in place of using a film fabricated by cold rolling, a anode having minimally at its surface a layer made of amorphous lithium or an alloy of amorphous lithium. An amorphous form is used in this technology to impede the formation of activated points at the crystal grain boundaries, which are characteristic points for dendrite growth on the surface of a metallic lithium anode, thereby achieving a uniform precipitation of lithium ions. Furthermore lithium precipitated by virtue of a high electron hole density, based on an amorphous structure is efficiently dispersed within the anode, thereby preventing the occurrence of concentrations of activated points at specific locations on the surface of the anode. It is difficult, however, using just an amorphous structure alone, to achieve a battery with good cycle performance. Additionally, with only amorphous lithium or an amorphous lithium alloy, there is a tendency for a reaction to occur at the time of fabricating the battery with water contained in the atmosphere, the electrolytic fluid, the cathode, or the separator or the like, making it necessary to establish strict conditions for the constituent elements battery fabrication process and the constituent elements thereof.

Accordingly, it is an object of the present invention to provide a lithium secondary cell featuring suppressed dendrite growth in a anode, which contains a metallic lithium or an alloy thereof, and featuring superior energy density, superior electromotive force, and superior cycle life.

SUMMARY OF THE INVENTION

To achieve the above-noted objects, the present invention adopts the following described technical constitution.

One aspect of the present invention achieving the above-noted objects is a lithium secondary cell, comprising, a anode formed on a conductive substrate and the anode comprising a lithium layer including therein either one of a metallic lithium and an alloy thereof, the anode further comprising a metal fluoride substance layer comprising at least one type metal fluoride, and wherein the lithium layer and the metal fluoride substance layer are formed by a vacuum film growth method.

Another aspect of the present invention is a lithium secondary cell in which a anode comprises a multiplied laminated structure in which are laminated a lithium layer and a metal fluoride substance layer being alternately laminated one on other.

Yet another aspect of the present invention is a lithium secondary cell in which a anode thereof formed on a conductive substrate and the anode comprising a lithium layer including therein either one of a metallic lithium and an alloy thereof, and wherein the lithium layer further contains at least one type of metal fluoride substance.

Still another aspect of the present invention is a lithium secondary cell which comprising a anode formed on a conductive substrate and the anode comprising a lithium layer including therein either one of a metallic lithium and an alloy thereof, the anode further comprising a metal fluoride substance layer comprising at least one type metal fluoride, and the anode comprising a hydrophobic substance layer which comprising at least one type of a hydrocarbon or ester, including one in which carbon is partially replaced by silicon or one in which hydrogen is partially or totally replaced by fluorine and metal fluoride substance layer which comprising at least one type of metal fluoride substance, wherein a surface of the anode comprising the hydrophobic substance layer or the metal fluoride substance layer.

Yet another aspect of the present invention is a method for manufacturing a lithium secondary cell, the method comprising a step of forming lithium layers comprising a lithium layer including therein a metallic lithium or an alloy thereof used for the anode and a metal fluoride substance layer comprising at least one type of metal fluoride substance by vacuum film growth method.

DETAILED DESCRIPTION OF THE PREFERRED EMBODIMENTS

Figure 1:
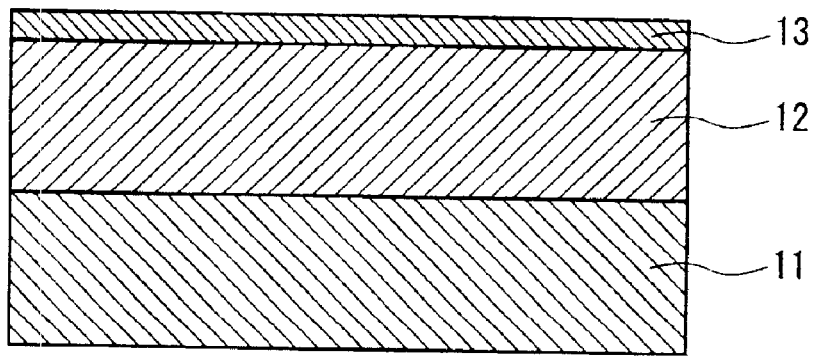
FIG. 1 is a general cross-sectional view of the anode part of an example of a lithium secondary cell according to a second embodiment of the present invention.

The inventors of the present invention discovered that, rather than using a chemical reaction in a covering film of metallic lithium or an alloy thereof, if a anode is fabricated by adding a metal fluoride substance between metallic lithium or alloy thereof formed as a vacuum film, it is possible to achieve a lithium secondary cell with superior cycle performance.

More specifically, a means provided by the present invention as a solution for the problems described above is a lithium secondary cell with a anode having a lithium layer containing a film of metallic lithium or alloy thereof, formed by a vacuum film growth method and note that the lithium secondary battery of the present invention is produced with a anode containing therein a metal fluoride layer comprising at least one metal fluoride substance and which is formed by a vacuum film growth method.

In the case of this arrangement, because a layer (lithium layer) made of metallic lithium or an alloy thereof is formed as a film in a vacuum, there is no lithium hydroxide or lithium oxide film or the like on the surface thereof, as occurred in the past. Additionally, because a metal fluoride layer is formed on the lithium layer without losing the vacuum condition, good amorphous properties are achieved, and a anode is obtained which has covering film made of a metal fluoride. It is also possible to grow a uniform metal fluoride layer by vacuum film growth method. As a result, and as will be readily understood from subsequently described embodiments, a lithium secondary cell according to the present invention has improved suppression of dendrite formation and growth and improved cycle life, compared to the case of the past, in which a metal fluoride layer is grown by means of a chemical reaction of the surface covering film. With the present invention, because a take-up type vacuum deposition apparatus is used to form a anode on a collector while maintaining the vacuum condition, not only is the process is simpler than the case of using a chemical reaction as done in the past, but also there is a reduction in the time required to fabricate the lithium secondary cell.

In the present invention, it is preferable that the metal fluoride layer be formed so as to be in contact with the anode surface or the collector. In the case of forming a metal fluoride layer on the surface of the anode, because it is possible to impede reactions with water content and impurities introduced from the electrolytic fluid, the cathode, and the separator, it is possible to achieve a superior cycle life. In the case of forming a metal fluoride layer in contact with the collector, it is possible both to prevent reactions between water content attached to the separator and activated lithium and to prevent peeling from the anode collector, thereby enabling the achievement of an improved cycle life.

The inventors discovered that it is also possible to achieve a superior effect by adopting a multilayered structure of lithium and metal fluoride layers, by mixing one or more types of metal fluorides with the lithium layer, or by providing an additional hydrophobic substance layer on the anode.

An alternate lithium secondary cell, having a multilayered structure of alternating laminations of layers containing metallic lithium or an alloy thereof and layers one type of metal fluoride, also suppresses dendrite growth on the anode and improves the cycle life. By adopting a multilayered structure for the anode in this manner, even if dendrite growth by a boundary reaction, which might occur between the anode and the electrolytic fluid, occurs, it is possible to stop this growth by a metal fluoride layer within the anode. In this case, although a sufficient cycle life is achieved even without any particular restriction with regard to the method for forming the layer, it is preferable to perform film growth using vacuum film growth, as vacuum film growth provides better suppression of anode dendrite growth and provides superior cycle life.

An alternate lithium secondary cell, having a anode with a layer containing a metallic lithium or an alloy thereof and at least one type of metal fluoride also suppresses anode dendrite growth and improves the cycle life. By using an anode having at least one type of metal fluoride mixed into metal lithium or an alloy thereof, it is possible to form a stable thin film having a surface with improved smoothness. In this case, although a sufficient cycle life is achieved even without any particular restriction with regard to the method for forming the layer, it is preferable to perform film growth using vacuum film growth, as vacuum film growth provides better suppression of anode dendrite growth and provides superior cycle life.

As noted in Japanese Patent Application No. 2000-198221, a lithium secondary cell having a anode in which a hydrophobic substance layer containing at least one type of a hydrocarbon or an ester (however with the carbon partially replaced by silicon, or the hydrogen partially or totally replaced by fluorine) and a metal fluoride layer containing at least one type of metal fluoride, and in which the surface of the anode is the above-noted hydrophobic substance layer or the above-noted metal fluoride layer also impedes dendrite occurrence and growth, and improves the cycle life. By forming a hydrophobic substance layer, it is possible to achieve further prevention of the adverse effect of water content and the like, thereby enabling the achievement of a secondary cell having superior cycle performance. In this case, although a sufficient cycle life is achieved even without any particular restriction with regard to the method for forming the metal fluoride layer and lithium layer, it is preferable to perform film growth using vacuum film growth, as vacuum film growth provides better suppression of anode dendrite growth and provides superior cycle life.

A lithium secondary cell using the above-noted metal fluoride layer or mixed layer features a stable anode surface, with little tendency toward dendrite formation, thereby enabling the achievement of good discharge characteristics, such as cycle life. Compared with the case of using metal fluoride or an alloy thereof as is, because it is possible to suppress reaction with water content introduced from the electrolytic fluid the cathode, and the separator or the like at the time of assembling the cell at the time of cell assembly, this provides an advantage in terms of manufacturing. A lithium secondary cell according to the present invention provides superior energy density and electromotive force approximately equivalent to that of a secondary cell having a metal fluoride layer as in the past.

Embodiments of the present invention are described in detail below, with references made to relevant accompanying drawings.

A lithium secondary cell according to the present invention has as a anode a lithium layer containing metallic lithium or an alloy thereof and a metal fluoride layer containing at least one type of metal fluoride, wherein the lithium layer and metal fluoride layer are formed by vacuum film growth. The metal fluoride layer is preferably formed on the surface of the anode so as to be in contact with the conductive base (collector). The surface of the anode referred to herein is the surface that is in contact with the electrolytic fluid, on the opposite side of the collector. A lithium secondary cell according to the present invention has a layer (mixed layer) containing metallic lithium or an alloy thereof and at least one type of metal fluoride, this mixed layer being formed by vacuum film growth. As described above, a lithium secondary cell according to the present invention achieves cycle life superior to that of a lithium cell of the past, by virtue of the mixed layer or the like, or the configuration of the anode, even without using vacuum film growth.

Although there is no particular restriction in the present invention with regard to the metal fluoride substance contained by the a metal fluoride layer, it is preferable that this be lithium fluoride, magnesium fluoride, silver fluoride, aluminum fluoride, calcium fluoride, cobalt fluoride, nickel fluoride, manganese fluoride (II), zinc fluoride, or the like, and it is particularly preferable from the standpoint of ease of vacuum film growth and thin film stability and the like, that this be at least on type of lithium fluoride, magnesium fluoride, silver fluoride, aluminum fluoride, or calcium fluoride. It is possible to use either one type or two types of metal fluoride.

The metal fluoride layer is usually obtained as an amorphous substance, by means of vacuum film growth, and it is preferable that the metal fluoride layer be amorphous even in the case in which it is formed by a method other than vacuum film growth.

The thickness of the metal fluoride layer is preferably 0.01 $\mu$m or greater, in order to achieve sufficient suppression of dendrite occurrence and growth, and it is preferable that this thickness be 5 μm or less, in order to prevent a high resistance. It is preferable that this thickness be 0.02 μm in order to achieve a substantially uniform covering film. In particular, it is preferable that the thickness be at least 0.05 μm and no greater than 5 μm in the case in which the metal fluoride layer is formed so as to come into contact with the electrolytic fluid, and particularly preferable that the thickness be at least 0.1 μm but no greater than 3 μm in order to achieve sufficient discharging capacity and sufficient stability.

In order to achieve stable, uniform activated points, the metal fluoride layer is formed by an appropriate vacuum film growth means, such as sputtering, CVD, or the like. However, as noted above, depending on the configuration of the anode, it is not necessary that the metal fluoride layer be formed by vacuum film growth, in which case the metal fluoride layer can, for example, can be formed by a film growing method making use of a chemical reaction of the surface covering film, or by cold rolling or the like. The film growth conditions for forming the metal fluoride layer are not particularly restricted, and can be set as appropriate.

With regard to vacuum deposition, it is possible to perform this by any one of a resistive heating method, an electron beam heating method, or an ion beam deposition method or the like. The deposition source can have the same composition as the layer to be formed.

The lithium layer according to the present invention contains metallic lithium or an alloy thereof. The lithium alloy used in the present invention can be a dual or triple alloy of metals such as Al, Pb, Sn, In, Bi, Ag, Mg, Ba, Ca, Hg, Pd, Pt, Sr, Te, and the like, and can further include an additive of Si, Cd, Zn, La, or the like. In the case of a lithium alloy, it is preferable that the amount of content other than lithium be 70% in terms of molecular ratio, since this enable the achievement of sufficient energy density and electromotive force.

The lithium layer is usually obtained as an amorphous layer, by means of vacuum film growth. The lithium layer is preferably an amorphous layer, even in the case in which it is not formed by vacuum film growth.

In order to achieve sufficient electromotive force and discharging capacitance, the thickness of the lithium layer is preferably 1 μm or greater, it is particularly preferable that this thickness be 5 μm or greater, and in order to prevent unwanted volume and weight, it is preferable that the thickness be no greater than 500 μm, and particularly that the thickness be no greater than 100 μm.

In order to impede the formation of activated points, at crystal grain boundaries and the like, which are characteristic points of dendrite growth on the surface of the metallic lithium anode, the lithium layer is formed by a vacuum film growth method, such as vacuum deposition, sputtering, or the like. Because of the configuration of the anode, as described above, however, it is not necessary to form the lithium layer by vacuum film growth, in which case it is possible form the lithium layer by, for example, cold rolling. There is no particular restriction with respect to the film growth conditions for forming the lithium layer, and these can be set as appropriate.

With regard to vacuum deposition, it is possible to perform this by any one of a resistive heating method, an electron beam heating method, or an ion beam deposition method or the like. The deposition source can have the same composition as the layer to be formed.

In the present invention, it is preferable that the anode have a multilayered construction of alternating laminations of lithium and metal fluoride layers, in which case it is preferable that the thickness of the metal fluoride layer be 0.005 μm or greater, and particularly preferable that this thickness by 0.05 μm or greater, in order to achieve sufficient suppression of the occurrence and growth of dendrites. It is preferable that the thickness by 3 μm or less, in order to prevent a high resistance, and particularly preferable in this respect that the thickness by no greater than 1 μm. In order to achieve sufficient discharging capacity, it is preferable that the thickness of the lithium layer be 0.1 μm or greater, and particularly preferable in this respect that the thickness be 1 μm or greater. In order to achieve sufficient dendrite suppression, it is preferable that there be at least two laminations each of the lithium layer and the metal fluoride layer. It is preferable that the total thickness of the laminated lithium layers and metal fluoride layers be 10 μm or greater but no greater than 500 μm. Furthermore, it is preferable that, in the case of an outermost metal fluoride layer in contact with the electrolytic fluid, the thickness be at least 0.05 μm, but no greater than 5 μm.

A mixed layer according to the present invention contains metallic lithium or an alloy thereof and at least one type of metal fluoride. The metallic lithium or alloy thereof used in the mixed layer is similar to the content of the lithium layer as described above, and the preferable compositions thereof are also the same as described above. The metal fluoride used in the mixed layer is similar to the metal fluoride layer content described above, as are the preferable compositions thereof.

While there is no restriction with regard to the composition of the mixed layer, it is preferable that the amount of content of metal fluoride in the mixed layer, in order to sufficiently suppress dendrite occurrence and growth, be 1 at % or greater, and it is particularly preferable that this content be 3 at % or greater, and that this content be 50 at % or less, within a range in which lithium-based discharge characteristics are prevented.

The mixed layer is usually obtained as an amorphous layer, by means of vacuum film growth. The mixed layer is preferably amorphous, even when it is not formed by vacuum film growth.

The thickness of the mixed film, in order to sufficiently suppress dendrite occurrence and growth, is 0.1 μm or greater, and preferably is 1 μm or greater. In order to prevent a large volume and weight, the thickness is preferably less than 100 μm, but at least 50 μm. In the case of the outermost surface, at which the mixed layer makes contact with the electrolytic fluid, it is preferable, in order to achieve sufficient discharging capacity and sufficient covering film stability, that the thickness be no less than 0.5 μm and no greater than 50 ∥m.

In order to achieve a stable and uniform mixed layer, it is preferable that formation be done by vacuum film growth, using a method such as a vacuum deposition method, a sputtering vacuum film growth method, or CVD or the like. However, because of the above-described configuration of the anode, it is not necessary that this layer be formed using vacuum film growth, in which case it can be formed, for example, by cold rolling or the like. There is no particular restriction with regard to the film growth conditions for the mixed layer, and these can be established as appropriate.

With regard to vacuum deposition, this can be performed using any one of a resistive heating method, an electron beam heating method, and an ion beam heating method or the like.

While it is preferable that the compositions of the metal fluoride layer, the lithium layer, and the mixed layer each be uniform, it is also possible to have a concentration gradient therein, in the film thickness direction. For example, in the mixed layer, it is acceptable to have a large content of metal fluoride at the outermost surface, which makes contact with the electrolytic fluid. A layer having this type of concentration gradient is obtained by varying the film growth conditions with time when the layer is formed.

With the lithium secondary cell according to the present invention, it is preferable to form on the anode a hydrophobic substance layer containing at least one type of hydrocarbon or ester, which substantially does not react with lithium. The hydrocarbon or ester contained by the hydrophobic layer includes a hydrocarbon or ester in which carbon is partially replaced by silicon, or in which hydrogen is partially or totally replaced by fluoride. The hydrophobic layer can alternately contain one or two or more hydrocarbons and/or esters.

The ester is preferably a carboxylic acid ester, and it is preferable that this be at least one of a fatty acid ester and a phenyl carboxylic ester. It is also preferable that this be a diester. It is preferable that the hydrophobic layer be at least one type of a carboxylic acid ester and a carboxylic acid ester fluoride, and particularly preferable that this include at least one type of a phthalic acid ester or a benzoic ester. These also can have partial replacement of carbon with silicon, or partial or total replacement of hydrogen with fluorine.

More specifically, it is preferable that the hydrocarbon and or ester contained by the hydrophobic layer be a phthalic acid ester dioxyl, cetyl naphthalene, or neroli oil, and it is particularly preferable that this be a compound that exhibits affinity with the surface of metallic lithium, of which compounds it is preferable that this have a phenyl radical such as phthalic acid dioxyl.

It is preferable that the hydrophobic layer be formed on the outermost surface of the anode. By surface treatment of the metallic lithium at the hydrophobic substance, a hydrophobic film is formed on the surface of the lithium, thereby improving the uniformity of the lithium surface. In particular, the carboxylic radical of the ester establishes a stable bond between the ester and the surface of the metallic lithium, and a hydrophobic radical having a low reactivity, such as an alkyl chain or phenyl chain or the like of the ester serves to provide a stable covering on the surface of the metallic lithium. As a result, not only is dendrite occurrence at the surface of the metallic lithium suppressed, but it is also possible to suppress a reaction with water introduced from the materials of the electrolytic fluid, the cathode, or the separator at the time of battery assembly.

Additionally, because it is possible to prevent the adverse effect of water content and the like, it is preferable that metal fluoride layer is formed below the hydrophobic substance layer.

It is preferable that a metal fluoride layer be formed on the outermost surface of the anode, and that a hydrophobic layer be formed therebelow. By doing this, it is possible to prevent the adverse effect of water content and the like, to suppress the occurrence and growth of dendrites a surface of the metallic lithium, and to achieve superior cycle performance.

In order to prevent the influence of the external atmosphere and water content, it is preferable that the thickness of the hydrophobic layer be at least 0.05 $\mu$m, particularly that this thickness be at least 0.1 $\mu$m. In order to avoid a large volume and weight, it is preferable that this thickness by 10 $\mu$m or less, and particularly that this thickness be 5 $\mu$m or less. It is preferable that the hydrophobic layer be formed over the entire surface of the anode.

A hydrophobic layer as described above, can be formed by immersion into a hydrophobic substance, by sputtering of a hydrophobic substance, or by vapor deposition thereof. The film growth conditions can be set as appropriate.

The anode of a lithium secondary cell according to the present invention has the above-noted metal fluoride layer, lithium layer and mixed layer and, if necessary, a hydrophobic substance layer, typical examples of the general cross-sections of which being shown in FIG. 1 through FIG. 6.

In the anode of the lithium secondary cell shown in FIG. 1 there is a lithium layer 12 containing metallic lithium or an alloy thereof on a collector 11, over which there is a metal fluoride layer 13 containing at least one type of metal fluoride. The lithium layer 12 and metal fluoride layer 13 are formed by vacuum film growth.

Figure 2:
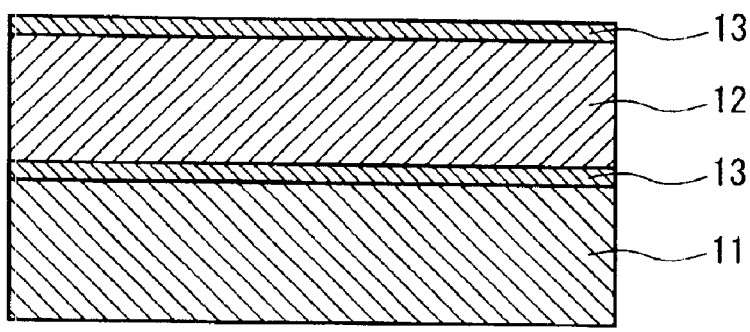
FIG. 2 is a general cross-sectional view of the anode part of an example of a lithium secondary cell according to a sixth embodiment of the present invention.

In the anode of the lithium secondary cell shown in FIG. 2, there is a metal fluoride layer 13 on a collector 11, over which there is a lithium layer 12, over which is formed a metal fluoride layer 13. The lithium layer 12 and the metal fluoride layer 13 are formed by vacuum film growth.

Figure 3:
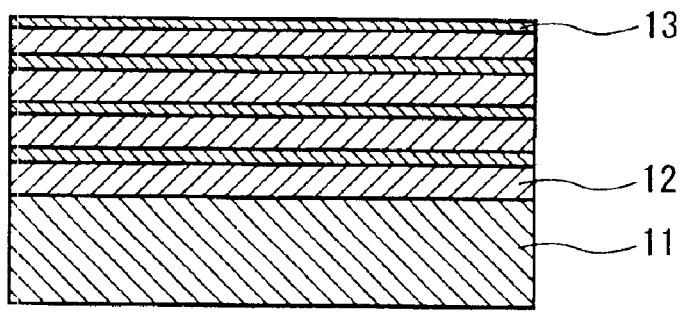
FIG. 3 is a general cross-sectional view of the anode part of an example of a lithium secondary cell according to an eleventh embodiment of the present invention.

In the anode of the lithium secondary cell shown in FIG. 3, there are four each of a lithium layer 12 and a metal fluoride layer 13 on a collector 11, formed as alternating laminations. It is preferable that the lithium layers 12 and the metal fluoride layers 13 are formed by vacuum film growth.

Figure 4:
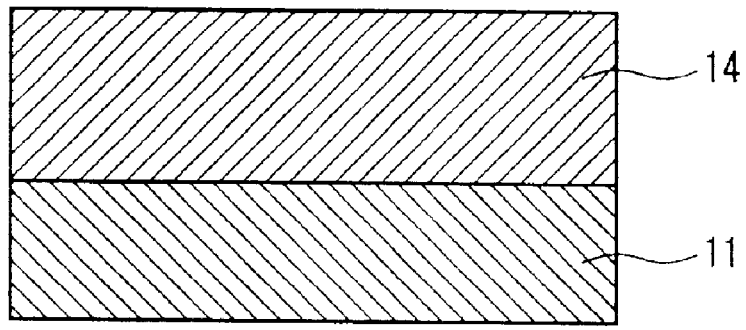
FIG. 4 is a general cross-sectional view of the anode part of an example of a lithium secondary cell according to a sixteenth embodiment of the present invention.

In the anode of the lithium secondary cell shown in FIG. 4, there is a mixed layer 14 containing metallic lithium or an alloy thereof and at least one type of metal fluoride layer on a collector 11. It is preferable that the mixed layer 14 be formed by vacuum film growth. Additionally, it is preferable that a hydrophobic substance layer containing at least one type of a hydrocarbon or ester be formed on the mixed layer 14.

Figure 5:
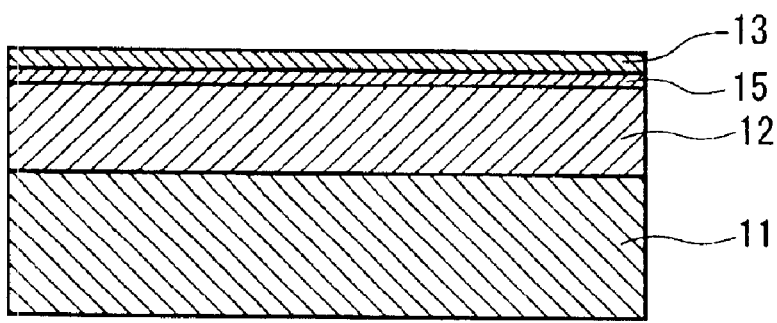
FIG. 5 is a general cross-sectional view of the anode part of an example of a lithium secondary cell according to a twenty-first embodiment of the present invention.

In the anode of the lithium secondary cell shown in FIG. 5, there is lithium layer 12 over a collector 11, over which there is a hydrophobic substance layer 15 containing at least one type of a hydrocarbon or an ester, over which is formed a metal fluoride layer 13. It is preferable that the lithium layer 12 and the metal fluoride layer 13 be formed by vacuum film growth.

Figure 6:
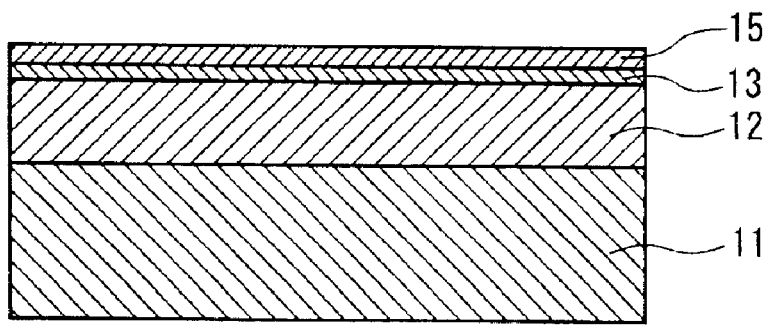
FIG. 6 is a general cross-sectional view of the anode part of an example of a lithium secondary cell according to a twenty-sixth embodiment of the present invention.

In the anode of the lithium secondary cell shown in FIG. 6, there is a lithium layer 12 over a collector 11, over which there is a metal fluoride layer 13, over which is formed a hydrophobic substance layer containing at least one type of a hydrocarbon and an ester. It is preferable that the lithium layer 12 and the metal fluoride layer 13 be formed by vacuum film growth.

The collector (electrically conductive base) used in a lithium secondary cell according to the present invention is not restricted, and can be a known collector. For example, this can be a sheet-shaped collector made of copper, nickel, stainless steel, aluminum, or silver or the like. It is usually preferable that the thickness of the collector be in the range from 5 to 20 $\mu$m.

The cathode used in a lithium secondary cell according to the present invention is not particularly restricted, and can be, for example a compound oxide, such as $Li_xMO_2$ or $Li_xMO_3$ (where M is at least one type of transition metal), examples of which are $Li_xCoO_2$, $Li_xNiO_2$, $Li_xMn_2O_4$, $Li_xMnO_3$, $Li_xNi_yC_{1-y}O_2$ or the like, a conductive substance such as carbon black, or binding agent such as polyvinylidene fluoride (PVDF) or the like, dispersed and mixed with a solvent such as N-methyl-2-pyrolidone, and then applied onto a base of aluminum or the like.

In a lithium secondary cell according to the present invention, in a dry air or an inert atmosphere, after the above-described anode and cathode are laminated via an intervening separator made from a polyolefin such as polypropylen or polyethylene, or a porous film made of fluoride resin, or such a laminate is rolled and housed in a battery can, a flexible film made of a laminate of synthetic resin and a metal foil is used to form a seal, thereby completing the fabrication of the battery.

There is no particular restriction with regard to the electrolytic fluid used in a lithium secondary cell according to the present invention, and this can be a known electrolytic fluid. For example, this can be one type or a mixture of two or more types of a cyclic carbonate such as propylene carbonate (PC), ethylene carbonate (EC), butylene carbonate (BC), or vinylene carbonate (VC), chain carbonate such as dimethyl carbonate (DMC), diethyl carbonate (DEC), ethylmethyl carbonate (EMC), dipropyl carbonate (DPC), an aliphatic carboxylic ester such as methyl formate, methyl acetate or ethyl propionate, a γ-lactone such as γ-butyrolactone, a chain ether such as 1,2-diethoxyl ethane (DEE), or ethoxy methoxy ethane (EME), a cyclic ether such as tetrahydrofuran or 2-methyltetrahydrofuran, a non-protone organic solvent such as dimethyl sulfoxide, 1,3-dioxolane, formamide, acetamide, dimethylformamide, dioxolane, acetonitril, propylnitorile, nitromethane, ethylmonogrime, phosphate triester, trimethoxy methane, dioxolane derivative, sulforane, methyl sulforane, 1,3 -dimethyl-2-imidazolydinone, 3-methyl-2-oxazolidinone, propylene carbonate derivatives, tetrahydrofuran derivatives, ethyl ether, 1,3-propanesultone, anisole, or N-methylpyrrolidone, with a lithium salt being dissolved into this organic solvent.

There is no restriction with regard to the lithium salt, and it is possible to use a known lithium salt, such as $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, low-aliphatic lithium carboxylate, lithium chloroborate, tetraphenyl lithium phosphate, LiBr, LiI, LiSCN, LiCl, or an imide.

It is also possible to use a polymer electrolyte in place of an electrolytic fluid, in which case there is no particular restriction with regard to the polymer electrolyte, it being possible to use a known substance.

Specific embodiments of the present invention are described in further detail below.

(First Embodiment)

In a first embodiment of the present invention, the vacuum pressure within a vacuum film growing apparatus is brought to $10^{-5}$ Pa, and using a copper foil (collector 11) having a height and width of 50 mm and a thickness of 10 μm is used as a substrate, with lithium vaporized using an electron beam, the substrate temperature being made 90° C. and the film growing speed being 10 nm/s, so that a lithium layer 12 is formed to a thickness of 20 μm. Next, without disturbing the vacuum, LiF is vaporized using resistive heating from a separate vaporization source (with the substrate temperature at 28° C.), so that a LiF layer 13 with a thickness of 2 μm is formed on the lithium layer 12 at a film growth rate of 1 nm/s, thereby forming the anode of the first embodiment of the present invention.

The battery is fabricated as follows.

The copper foil, onto which are formed the lithium layer 12 and the LiF layer 13, is cut to 45-by-40 mm and nickel tab is welded and used as a anode, and $LiMn_2O_4$ is mixed with carbon black or polyvinylidene fluoride (PVDF), using N-methyl-2-pyroridone (NMP) as a solvent, so as to form distributed and mixed anode paint onto one surface of the aluminum foil, this having a thickness of 130 μm after correction, thereby forming the cathode. Using an ethylene carbonate (EC) and diethyl carbonate (DEC) mixture (EC:DEC ratio of 3:7) as a solvent medium, 1M or $LiPF_6$ is dissolved thereinto, so as to obtain an electrolytic fluid. Then the anode and the cathode are laminated, with a porous separator made of polyethylene therebetween, a polypropylene film on one surface of the aluminum foil and a nylon film on the other surface thereof being used as outer covering materials, thereby completing the fabrication of the lithium secondary cell.

(Charging Characteristics)

A charging/discharging cycle test was performed at a temperature of 20° C., a charging rate of 0.5 C, a discharging rate of 0.5 C, a charging end voltage of 4.2 V, and a discharging end voltage of 3.0 V to determine the cycle life. The term cycle life used herein refers to the number of elapsed cycles at which the discharging capacity has reached 80% of the capacity at the first cycle. For the lithium secondary cell according to the first embodiment of the present invention, this was 200 cycles.

COMPARISON EXAMPLE 1

Figure 7:
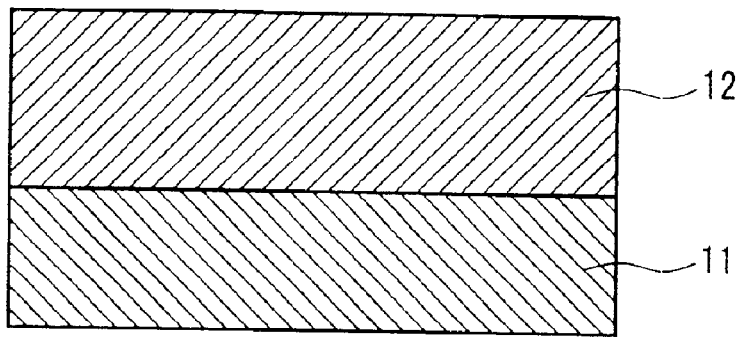
FIG. 7 is a general cross-sectional view of the anode part of a lithium secondary cell according to the first comparison example.

In this comparison example 1, the anode was formed the same as shown in FIG. 7, with the exception of forming a metal fluoride after forming the metallic lithium layer 12 using vacuum film growth in the formation of the anode. This anode was used to form a battery in the same manner as described with regard to the first embodiment, an investigation of the cycle performance thereof, made in the same manner as the first embodiment, showing that the cycle life was 40 cycles.

COMPARISON EXAMPLE 2

Figure 8:
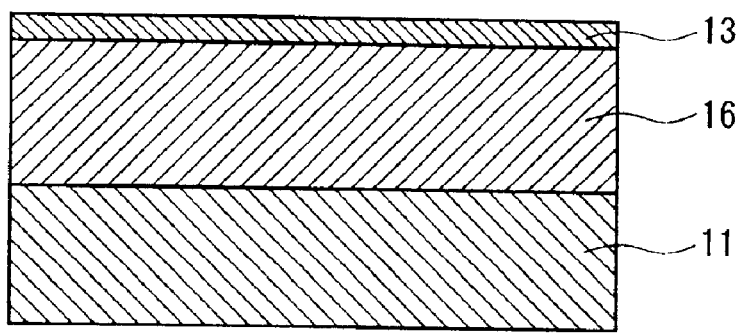
FIG. 8 is a general cross-sectional view of the anode part of a lithium secondary cell according to the second comparison example.

The lithium layer 16 was rolled so as to have a height and width of 50 mm, and a thickness of 10 μm formed onto a copper foil. Next, this copper was placed within a vacuum film growth apparatus, and an LiF layer 13 having a thickness of 2 μm was formed on the previously formed lithium layer 16, in the same manner as in the above-described first embodiment, so as to fabricate a anode of comparison example 2, as shown in FIG. 8. Then, a lithium secondary cell was formed using this anode, in the same manner as described with regard to the first embodiment, an investigation of the cycle life thereof indicating a cycle life of 35 cycles.

COMPARISON EXAMPLE 3

The Anode was Fabricated as Follows.

The vacuum pressure within a vacuum film growth apparatus was brought to $10^{-5}$ Pa, and using a copper foil (collector 11) having a height and width of 50 mm and a thickness of 10 μm is used as a substrate, with lithium vaporized using an electron beam, the substrate temperature being made 90° C. and the film growing speed being 10 nm/s, so that a lithium layer 12 is formed to a thickness of 20 μm. The copper foil onto which this lithium layer is formed is left in the air for 2 hours, so that a covering film of lithium hydroxide and lithium oxide is formed thereon.

The battery is fabricated as follows.

The copper foil, onto which are formed the lithium layer 12, is cut to 45-by-40 mm and nickel tab is welded and used as a anode, and $LiMn_2O_4$ is mixed with carbon black or polyvinylidene fluoride (PVDF), using N-methyl-2-pyroridone (NMP) as a solvent, so as to form distributed and mixed anode paint onto one surface of the aluminum foil, this having a thickness of 130 μm after drying, thereby forming the cathode. Using an ethylene carbonate (EC) and diethyl carbonate (DEC) mixture (EC:DEC ratio of 3:7) as a solvent medium, 1M or LiPF$_6$ is dissolved thereinto, and further water is mixed so as to achieve a water content concentration of 800 ppm and obtain an electrolytic fluid. Then the anode and the cathode are laminated, with a porous separator made of polyethylene therebetween, a polypropylene film on one surface of the aluminum foil and a nylon film on the other surface thereof being used as outer covering materials, thereby completing the fabrication of the lithium secondary cell of the comparison example 3. The fabricated secondary cell is left for 80 hours, so as to form a covering film (LiF layer 17) of lithium fluoride on the anode surface.

(Cycle Performance)

An investigation of the cycle life was performed in the same manner as for the first embodiment, this indicating that the cycle life was 45 cycles.

COMPARISON EXAMPLE 4

The anode was formed as follows.

Figure 9:
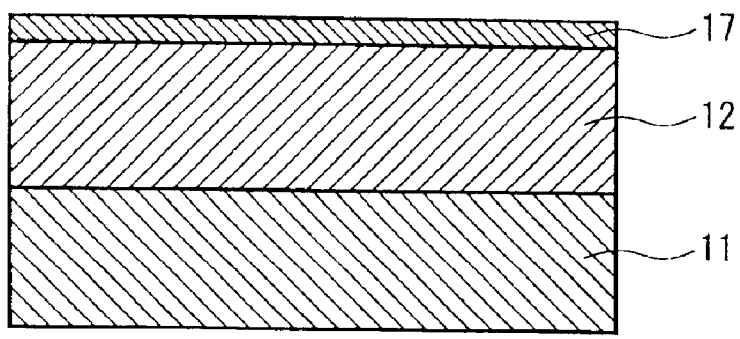
FIG. 9 is a general cross-sectional view of the anode of a lithium secondary cell used on the third comparison example and the fourth comparison example.

The vacuum pressure within a vacuum film growth apparatus was brought to $10^{-5}$ Pa, and using a copper foil (collector 11) having a height and width of 50 mm and a thickness of 10 μm as a substrate, lithium was vaporized using an electron beam, the substrate temperature being made 90° C. and the film growing speed being 10 nm/s, so that a lithium layer 12 is formed to a thickness of 20 μm. Next, the copper foil onto which this lithium layer is formed is transferred to a glove box adjacent to the vacuum chamber, this being filled with argon gas, which contains hydrogen fluoride with a volumetric concentration of approximately 0.05%, leaving the copper foil therein for approximately 2 hours at room temperature, so as to form an LiF layer 17, thereby forming a anode of comparison example 4, as shown in FIG. 9.

(Battery Fabrication and Cycle Characteristics)

The above-noted copper foil 11, on which are formed the lithium layer 12 and the LiF layer 17, is cut to 45-by-40 mm and a battery is formed in the same manner as described with regard to the first embodiment. The results of a comparative evaluation of the cycle characteristics relative to the first embodiment indicate the cycle life was 45 cycles.

The results obtained from the first embodiment and comparison examples 1 to 4 are shown in Table 1.

TABLE 1

|  | First Embodiment | Comparison Example 1 | Comparison Example 2 | Comparison Example 3 | Comparison Example 4 |
|---|---|---|---|---|---|
| Li layer | Vapor deposition | Vapor deposition | Cold rolling | Vapor deposition | Vapor deposition |
| LiF layer | Vapor deposition | — | Vapor deposition | Reaction with electrolytic fluid | Reaction with HF |
| No. of cycles | 200 | 400 | 35 | 45 | 45 |

The cycle life of a lithium secondary cell according to the first embodiment is 200 cycles, this being 5 times that of comparison example 1, 5.7 times that of comparison example 2, and 4.4 times that of comparison examples 3 and 4. This is thought to be because, by laminating metallic lithium and lithium fluoride layers by using vacuum film growth on the collector, there is an improvement with respect to comparison examples 1 to 4 in terms of uniformity of the anode surface covering, this being a manifestation of the effect of, for example, the stable covering by an LiF layer, which has low reactivity, on the surface of the metallic lithium layer.

(Second to Fifth Embodiments)

In place of the above-noted LiF indicated in the foregoing first embodiment, an anode and cell were fabricated and evaluated, using the metal fluorides shown in FIG. 2, with all other elements being the same as the first embodiment.

Table 2 shows the results obtained with the second through the fifth embodiments.

TABLE 2

|  | First Embodiment | Second Embodiment | Third Embodiment | Fourth Embodiment | Fifth Embodiment |
|---|---|---|---|---|---|
| Metal fluoride | LiF | MgF$_2$ | AlF$_3$ | CaF$_2$ | AgF |
| No. of cycles | 200 | 180 | 175 | 150 | 120 |

(Sixth Embodiment)

(Anode Fabrication by Vapor Deposition)

An anode of the sixth embodiment as shown in FIG. 2 was fabricated as follows.

The vacuum pressure within a vacuum film growth apparatus was brought to $10^{-5}$ Pa, and using a copper foil (collector 11) having a height and width of 50 mm and a thickness of 10 μm as a substrate, lithium was vaporized using an electron beam, the substrate temperature being made 90° C. and the film growing speed being 10 nm/s, so that a lithium layer 12 is formed to a thickness of 20 μm. Additionally, without disturbing the vacuum, LiF is deposited onto the above-noted lithium layer 12 using resistive heating, so as to form an LiF layer 13 to a thickness of 2 μm at a rate of 1 nm/s at room temperature (25° C.).

(Battery Fabrication)

The above-noted copper foil 11, on which are formed the LiF layer 13 and the lithium layer 12, is cut to 45-by-40 mm, and a nickel tab is welded and used as a anode, so as to fabricate a lithium secondary cell in the same manner as the case of the first embodiment.

(Cycle Characteristics)

The results of a comparative evaluation of the cycle characteristics in the same manner as for the first embodiment indicate the cycle life was 270 cycles, which is 6.8 times that of the first embodiment. This is an improvement of 35% relative to the first embodiment, a lithium fluoride layer 13 being provided in contact with the collector 11 as shown in the sixth embodiment, this teaching the effectiveness of using a anode with a lithium layer 12 formed thereover.

(Seventh to Tenth Embodiments)

An anode and cell similar to the sixth embodiment were fabricated and evaluated, with all other elements, except for the use of the metal fluorides shown in Table 2, being the same as indicated with regard to the sixth embodiment.

Table 3 shows the results obtained with the sixth to tenth embodiments.

TABLE 3

|  | Sixth Embodiment | Seventh Embodiment | Eight Embodiment | Ninth Embodiment | Tenth Embodiment |
|---|---|---|---|---|---|
| Metal fluoride | LiF | MgF$_2$ | AlF$_3$ | CaF$_2$ | AgF |
| No. of cycles | 270 | 195 | 190 | 180 | 150 |

(Eleventh Embodiment)
(Anode Fabrication by vapor Deposition)

An anode of the eleventh embodiment as shown in FIG. 3 was fabricated as follows.

The vacuum pressure within a vacuum film growth apparatus was brought to $10^{-5}$ Pa, and using a copper foil (collector 11) having a height and width of 50 mm and a thickness of 10 μm as a substrate, lithium was vaporized using an electron beam, the substrate temperature being made 90° C. and the film growing speed being 10 nm/s, so that a lithium layer 12 is formed to a thickness of 5 μm. Next, without disturbing the vacuum, LiF from a separate vapor deposition source is deposited by resistive heating, thereby forming the LiF layer 13 to a thickness of 0.5 μm at a rate of 1 nm/s at room temperature (25° C.). Then, the 5 μm lithium layer and the 0.5 μm LiF layer are laminated three times onto the above-noted LiF layer 13, thereby fabricating the anode of the eleventh embodiment of the present invention. The final LiF layer is formed so as to have a thickness of 2 μm.

(Battery Fabrication)

The above-noted copper foil 11, on which are formed the lithium layer 12 and the LiF layer 13, is cut to 45-by-40 mm, and a nickel tab is welded as a anode, thereby forming a lithium secondary cell in the same manner as the first embodiment.

(Cycle Characteristics)

The results of an evaluation of the cycle characteristics, performed in the same manner as for the first embodiment, indicated a cycle life that is 7.5 times that of the comparison example 1. The number of cycles is further improved over the first embodiment and the sixth embodiment, thereby teaching the further effectiveness of using a anode having a laminated structure of alternate laminations of the lithium layer 12 and the LiF layer 13 deposited on the collector, as shown with regard to the eleventh embodiment.

(Twelfth to Fifteenth Embodiments)

A anode and battery were formed in the same manner as the tenth embodiment, with the exception that, in place of the LiF used in that embodiment, the metal fluoride substances shown in Table 3 were used, and an evaluation of the anode and cell was made in the same manner as described with regard to the eleventh embodiment.

Table 4 shows the results of the evaluation of the eleventh to the fifteenth embodiments.

|  | Eleventh Embodiment | Twelfth Embodiment | Thirteen Embodiment | Fourteenth Embodiment | Fifteenth Embodiment |
|---|---|---|---|---|---|
| Fluoride | LiF | MgF$_2$ | AlF$_3$ | CaF$_2$ | AgF |
| No. of cycles | 300 | 205 | 180 | 190 | 180 |

(Sixteenth Embodiment)
(Anode Fabrication by Vapor Deposition)

An anode of the sixteenth embodiment as shown in FIG. 4 was fabricated as follows.

The vacuum pressure within a vacuum film growth apparatus was brought to $10^{-5}$ Pa, and using a copper foil (collector 11) having a height and width of 50 mm and a thickness of 10 μm as a substrate, lithium was vaporized using an electron beam, simultaneously with which LiF from a separate vapor deposition source is deposited by resistive heating, so that the LiF is 5 at % overall, a mixed layer (mixed layer 14) being formed to a thickness of 22 μm. The substrate temperature at the time of growing the mixed layer was 25° C., and the film growth rate was 1 nm/s.

(Battery Fabrication)

The copper foil, on which is formed a layer 14, this being a mixed layer having the above-noted lithium fluoride and lithium, is cut to 45-by-40 mm, and a nickel tab is welded as a anode, thereby forming a lithium secondary cell in the same manner as the first embodiment.

(Cycle Characteristics)

The results of an evaluation of the cycle characteristics, performed in the same manner as for the first embodiment, indicated a cycle life of 220 cycles, this being 5.5 times that of the comparison example 1. These results teach the further effectiveness of using anode provided with a mixed layer 14 of lithium and LiF, deposited onto the collector 11 as indicated with regard to the sixteenth embodiment.

(Seventeenth to Twentieth Embodiments)

A anode and battery were formed and evaluated in the same manner as the sixteenth embodiment, with the exception of the use of the metal fluoride substances shown in Table 4 in place of the LiF indicated for the sixteenth embodiment.

Table 5 shows the results of the evaluation of the sixteenth to twentieth embodiments.

TABLE 5

|  | Sixteenth Embodiment | Seventeenth Embodiment | Eighteenth Embodiment | Nineteenth Embodiment | Twentieth Embodiment |
|---|---|---|---|---|---|
| Fluoride | LiF | MgF$_2$ | AlF$_3$ | CaF$_2$ | AgF |
| No. of cycles | 220 | 190 | 175 | 160 | 130 |

(Twenty-First Embodiment)
(Anode Fabrication by Vapor Deposition)

An anode of the twenty-first embodiment as shown in FIG. 5 was fabricated as follows.

The vacuum pressure within a vacuum film growth apparatus was brought to $10^{-5}$ Pa, and using a copper foil (collector 11) having a height and width of 50 mm and a thickness of 10 μm as a substrate, lithium was vaporized using an electron beam, thereby forming a lithium film to a thickness of 20 μm. Next, without exposing it to the air, the above-noted substrate is transferred to a glove box adjacent to the vacuum chamber, which is filled with argon gas, in which the above-noted substrate, onto which lithium has been deposited, is immersed in a phthalic acid dioxyl at 45° C. for 3 hours, so as to form a hydrophobic substance layer 15, made of phthalic acid dioxyl, to a thickness of 1 μm on the surface of the lithium. Next, without exposing it to the air, the above-noted substrate is transferred to the above-noted vacuum chamber, in which LiF is vaporized onto the hydrophobic substance layer 15 using resistive heating, so as to form an LiF layer to a thickness of 2 μm at film growth rate of 1 nm/s, in a vacuum of $10^{-5}$ Pa at room temperature (25° C.), thereby fabricating the anode of the twenty-first embodiment of the present invention.

(Battery Fabrication)

The above-noted copper foil 11, on which are formed the lithium layer 12 and the LiF layer 13 and the lithium layer 12, is cut to 45-by-40 mm, and a nickel tab is welded and used as a anode, so as to fabricate a lithium secondary cell in the same manner as the case of the first embodiment.

(Cycle Characteristics)

The results of a comparative evaluation of the cycle characteristics in the same manner as for the first embodiment indicate the cycle life was 30 cycles, which is 7.5 times that of the first embodiment. This cycle life is a further improvement over the first embodiment, and teaches the effectiveness of forming a hydrophobic substance layer 15 of phthalic acid dioxyl over the lithium layer 12 formed by deposition as indicated in the above-described twenty-first embodiment, and then performing lamination by vacuum growing a LiF layer 13.

(Twenty-Second to Twenty-Fifth Embodiments)

A anode and battery were formed and evaluated in the same manner as the twenty-first embodiment, with the exception of the use of the metal fluorides shown in Table 5 in place of the LiF indicated for the twenty-first embodiment.

Table 6 shows the results of the evaluation of the twenty-first to twenty-fifth embodiments.

TABLE 6

|  | Twenty-First Embodiment | Twenty-Second Embodiment | Twenty-Third Embodiment | Twenty-Fourth Embodiment | Twenty-Fifth Embodiment |
|---|---|---|---|---|---|
| Fluoride | LiF | $MgF_2$ | $AlF_3$ | $CaF_2$ | AgF |
| No. of cycles | 250 | 200 | 195 | 160 | 140 |

(Twenty-Sixth Embodiment)

(Anode Fabrication by Vapor Deposition)

A anode of the twenty-sixteenth embodiment as shown in FIG. 6 was fabricated as follows.

The vacuum pressure within a vacuum film growth apparatus was brought to $10^{-5}$ Pa, and using a copper foil (collector 11) having a height and width of 50 mm and a thickness of 10 μm as a substrate, lithium was vaporized using an electron beam, so as to form a lithium layer 12 to a thickness of 20 μm, at a growth rate of 10 nm/s. Next, without disturbing the vacuum condition, LiF from a separate vaporization source is vaporized so as to form a LiF layer 13 to a thickness of 2 μm at a growth rate of 1 nm/s at room temperature (substrate temperature of 25° C.). Next, without exposing it to the air, the above-noted substrate is transferred to a glove box adjacent to the vacuum chamber, which is filled with argon gas, in which the substrate, onto which have been deposited the lithium layer 12 and the LiF layer 13, is immersed in phthalic acid dioxyl for 3 hours at 45° C., so as to form a hydrophobic substance layer 15 made of phthalic acid dioxyl onto the surface of the LiF layer 13, thereby forming the anode of the twenty-sixth embodiment of the present invention.

(Battery Fabrication)

The copper foil, on which is formed the lithium layer 12, the LiF layer 13, and the hydrophobic substance layer 15, is cut to 45-by-40 mm, and a nickel tab is welded as a anode, thereby forming a lithium secondary cell in the same manner as the first embodiment.

(Cycle Characteristics)

The results of an evaluation of the cycle characteristics, performed in the same manner as for the first embodiment, indicated a cycle life of 280 cycles, this being 7 times that of the comparison example 1. This is a further improvement over the first embodiment, and these results teach the effectiveness of using anode in which vacuum film growth is used to laminate a metal fluoride layer 13 onto the lithium layer 12 which is formed by vapor deposition as described with regard to the twenty-sixth embodiment, and further forming a hydrophobic substance layer 15 made of phthalic dioxyl.

(Twenty-Seventh to Thirtieth Embodiments)

An anode and battery were fabricated and evaluated similarly to the above-noted twenty-sixth embodiment, with the exception of the use of the metal fluorides shown in Table 5.

Table 7 shows the results otained from the twenty-sixth to thirtieth embodiments.

|  | Twenty-Sixth Embodiment | Twenty-Seventh Embodiment | Twenty-Eighth Embodiment | Twenty-Ninth Embodiment | Thirtieth Embodiment |
|---|---|---|---|---|---|
| Fluoride | LiF | $MgF_2$ | $AlF_3$ | $CaF_2$ | AgF |
| No. of cycles | 280 | 210 | 205 | 180 | 170 |

As described in detail above, a lithium secondary cell and method for manufacturing same, by adopting the novel anode according to the present invention, not only achieve such superior performance as energy density and electromotive force as conventionally achieved with a anode of metallic lithium or an alloy thereof, but also suppress the occurrence and growth of dendrites on the anode.

What is claimed is:

1. A lithium secondary cell comprising, an anode formed on a conductive substrate and said anode comprising a lithium layer comprising either one of a metallic lithium and an alloy thereof, said anode further comprising a metal fluoride substance layer comprising at least one type metal fluoride, wherein said lithium layer and said metal fluoride substance layer are formed by a vacuum film growth method, and wherein said anode comprises a multilayered alternating laminated structure comprising said lithium layer and said metal fluoride substance layer being alternately laminated one on other.

2. A lithium secondary cell, comprising:

an anode formed on a conductive substrate and said anode comprising a lithium layer including therein either one of a metallic lithium and an alloy thereof, said anode further comprising a metal fluoride substance layer comprising at least one type metal fluoride, said anode comprising a multilayered alternating laminated structure comprising said lithium layer and said metal fluoride substance layer being alternately laminated one on other.

3. A method for manufacturing an anode comprising forming an anode on a conductive substrate wherein said anode comprises forming by a vacuum film growth method a lithium layer comprising either one of a metallic lithium and an alloy thereof, and said anode further comprises forming by a vacuum film growth method a metal fluoride substance layer comprising at least one compound selected from the group consisting of lithium fluoride, magnesium fluoride, silver fluoride, aluminum fluoride, and calcium fluoride.

4. A lithium secondary cell, comprising:

an anode formed on a conductive substrate and said anode comprising a lithium layer comprising either one of a metallic lithium and an alloy thereof, said anode further comprising a metal fluoride substance layer comprising at least one type metal fluoride, wherein said lithium layer has substantially no lithium hydroxide or lithium oxide film or the like on the surface thereof;

wherein said metal fluoride substance layer is in contact with said conductive substrate.

5. A lithium secondary cell, comprising:

an anode formed on a conductive substrate and said anode comprising a lithium layer comprising either one of a metallic lithium and an alloy thereof, said anode further comprising a metal fluoride substance layer comprising at least one type metal fluoride, wherein said lithium layer has substantially no lithium hydroxide or lithium oxide film or the like on the surface thereof, and wherein said anode comprises a multilayered alternating laminated structure comprising said lithium layer and said metal fluoride substance layer being alternately laminated one on other.

6. A lithium secondary cell, comprising:

an anode formed on a conductive substrate and said anode comprising a lithium layer including therein either one of a metallic lithium and an alloy thereof, said anode further comprising a metal fluoride substance layer comprising at least one type metal fluoride, wherein said lithium layer has substantially no lithium hydroxide or lithium oxide film or the like on the surface thereof.

7. A lithium secondary cell according to claim 6, wherein a metal fluoride substance layer is provided on a surface of said anode.

8. A lithium secondary cell according to claim 6, wherein said metal fluoride substance comprises at least one selected from the group consisting of lithium fluoride, magnesium fluoride, silver fluoride, aluminum fluoride, and calcium fluoride.

9. A lithium secondary cell comprising, an anode formed on a conductive substrate and said anode comprising a lithium layer including therein either one of a metallic lithium and an alloy thereof, said anode further comprising a metal fluoride substance layer comprising at least one type metal fluoride, wherein said lithium layer and said metal fluoride substance layer are formed by a vacuum film growth method, and wherein said metal fluoride substance layer is in contact with said conductive substrate.

* * * * *

UNITED STATES PATENT AND TRADEMARK OFFICE
CERTIFICATE OF CORRECTION

PATENT NO. : 6,964,829 B2 Page 1 of 1
APPLICATION NO. : 09/985852
DATED : November 15, 2005
INVENTOR(S) : Koji Utsugi et al.

It is certified that error appears in the above-identified patent and that said Letters Patent is hereby corrected as shown below:

Column 8, line 51, delete "50 ||m" insert --50 µm--.

Signed and Sealed this

Sixteenth Day of January, 2007

JON W. DUDAS
*Director of the United States Patent and Trademark Office*